United States Patent
Connell et al.

(10) Patent No.: US 12,494,287 B1
(45) Date of Patent: Dec. 9, 2025

(54) METHODS RELATING TO MEDICAL DIAGNOSTICS AND TO MEDICAL DIAGNOSTIC SYSTEMS

(71) Applicant: UNIVERSITY OF JOHANNESBURG, Johannesburg (ZA)

(72) Inventors: Simon Henry Connell, Johannesburg (ZA); Martin Nkululeko Hogan Cook, Johannesburg (ZA); Richard Charles Andrew, Johannesburg (ZA)

(73) Assignee: UNIVERSITY OF JOHANNESBURG, Auckland Park (ZA)

( * ) Notice: Subject to any disclaimer, the term of this patent is extended or adjusted under 35 U.S.C. 154(b) by 381 days.

(21) Appl. No.: 17/924,819

(22) PCT Filed: May 13, 2021

(86) PCT No.: PCT/IB2021/054109
§ 371 (c)(1),
(2) Date: Nov. 11, 2022

(87) PCT Pub. No.: WO2021/229497
PCT Pub. Date: Nov. 18, 2021

(30) Foreign Application Priority Data

May 13, 2020 (ZA) .................. 2020/02707

(51) Int. Cl.
*G16H 50/50* (2018.01)
*A61B 6/00* (2006.01)
(Continued)

(52) U.S. Cl.
CPC ............. *G16H 50/20* (2018.01); *A61B 6/032* (2013.01); *A61B 6/4258* (2013.01);
(Continued)

(58) Field of Classification Search
CPC ........ G16H 50/20; G16H 50/50; A61B 6/032; A61B 6/4258; A61B 6/5205;
(Continued)

(56) References Cited

U.S. PATENT DOCUMENTS

2018/0018757 A1   1/2018   Suzuki
2019/0156477 A1   5/2019   Perrin et al.
(Continued)

FOREIGN PATENT DOCUMENTS

WO   2019/183584 A1   9/2019

*Primary Examiner* — Iriana Cruz
(74) *Attorney, Agent, or Firm* — Ruggiero McAllister & McMahon LLC

(57) ABSTRACT

This invention relates to methods and systems relating to medical diagnostics. In particular, the invention relates to a method of processing data from a medical diagnostic system which comprises a detector arrangement configured to detect interaction of high energy particles with tissue. The method comprises receiving diagnostic data associated with interaction of high energy particles with tissue, wherein the diagnostic data is generated as a result of interaction of the high energy particles and the tissue being detected by the detector arrangement of the medical diagnostic system. The method further comprises processing the received diagnostic data with a trained machine-based classifier in order to facilitate and/or assist a medical diagnosis, wherein the trained machine-based classifier is trained at least with digital diagnostic data generated by a digital twin of the medical diagnostic system, wherein the digital twin is a computer-implemented simulation of at least part of the medical diagnostic system.

20 Claims, 6 Drawing Sheets

(51) Int. Cl.
  *A61B 6/03* (2006.01)
  *A61B 6/42* (2024.01)
  *G06T 11/00* (2006.01)
  *G06V 10/764* (2022.01)
  *G16H 50/20* (2018.01)

(52) U.S. Cl.
  CPC .......... *A61B 6/5205* (2013.01); *A61B 6/5258* (2013.01); *G06T 11/003* (2013.01); *G06V 10/764* (2022.01); *G16H 50/50* (2018.01); *G06T 2211/441* (2023.08)

(58) Field of Classification Search
  CPC ................ A61B 6/5258; G06T 11/003; G06T 2211/441; G06V 10/764
  See application file for complete search history.

(56) References Cited

U.S. PATENT DOCUMENTS

| | | | |
|---|---|---|---|
| 2019/0384871 A1* | 12/2019 | Matei | G06N 20/00 |
| 2020/0005495 A1* | 1/2020 | Teshigawara | A61B 6/4266 |
| 2020/0065940 A1* | 2/2020 | Tang | G06T 3/40 |
| 2021/0334655 A1* | 10/2021 | Obika | G06N 3/08 |
| 2022/0230759 A1* | 7/2022 | Abu El Ata | G16H 10/60 |
| 2022/0354579 A1* | 11/2022 | Dyer | A61B 34/25 |
| 2024/0206907 A1* | 6/2024 | Wu | A61B 17/3403 |
| 2024/0378347 A1* | 11/2024 | Roham | G06F 30/17 |

\* cited by examiner

METHODS RELATING TO MEDICAL DIAGNOSTICS AND TO MEDICAL DIAGNOSTIC SYSTEMS

FIELD OF INVENTION

THIS INVENTION relates to methods and systems relating to medical diagnostics. In particular, to a method of facilitating and/or assisting in a medical diagnosis of a human or animal, a method of operating a medical diagnostic system, a method of processing data from a medical diagnostic system, and medical diagnostic system.

BACKGROUND OF THE INVENTION

Certain forms of diagnostic medicine involves exposing living tissue, for example, the human body or parts thereof to radiation, either internally via radionuclides/radiotracers introduced into the body as is the case for positron emission tomography (PET), or externally by exposing the body to X-ray radiation as in the case of X-Ray Radiography or Computer Tomography (CT). These techniques use a suitable detector arrangement to detect the resultant interaction of the human tissue, for example, organ tissue with highly energy particles such as photons and/or electrons or similar as the radiation penetrates and propagates through the tissue. The radiation-tissue interactions are either absorption and/or scattering of the radiation. Raw data from the detected interaction from the detector arrangements is generally meaningless to humans and as such it is processed to generate and/or assemble suitable images for inspection by a medical professional trained to interpret said images. It follows that these techniques are colloquially referred to as medical imaging techniques.

Some well-known but not exhaustive examples of images generated by these imaging techniques would be a two-dimensional radiographic X-ray images or three-dimensional tomographic data set based on a set of X-ray projection radiograms as is the case with CT/CAT (Computer Assisted Tomography) scan images. Other examples of images generated by the aforementioned techniques include three-dimensional tomographic data sets based on PET.

In the case of the CAT scan, the radiation-tissue interaction is the basis of the image formation process and also of the image degradation process. In the case of the PET scan, the radiation source is internal, with differential three-dimensional concentration distributions. Here, the imaging process applies to reconstruction of the three-dimensional concentration distribution of the source. The radiation-tissue interaction leads only to degradation of the image. The emission properties of the source, the efficiency of the detector and down-stream signal processing also lead to degradation of the image.

It is therefore clear that high-fidelity image reconstruction requires considerable correction for the statistics and systematics of the entire image formation process.

Moreover, due to the shortage of medical professionals trained to interpret images and data generated by the aforementioned medical imaging techniques, it is desirous to have at least some assistance in diagnosing patients. This problem becomes exacerbated during periods of pandemic where resources and medical professionals in particular are under pressure and would welcome assistance.

The invention as described herein seeks to address at least the above-mentioned problems. However, it will be evident to those skilled in the art that other problems addressed by the invention disclosed herein will be evident from the disclosure contained herein.

SUMMARY OF THE INVENTION

According to a first aspect of the invention, there is provided a method of facilitating and/or assisting in a medical diagnosis of a human or animal based on diagnostic data from a medical diagnostic system, wherein the method comprises generating a digital twin of the medical diagnostic system, wherein the digital twin is a computer-implemented simulation of at least part of the medical diagnostic system, and is configured to output digital diagnostic data which approximates diagnostic data generated as a result of interaction of the high energy particles and tissue in the medical diagnostic system.

According to a second aspect of the invention, there is provided a method of operating a medical diagnostic system which comprises at least a suitable detector arrangement configured to detect interaction of high energy particles with tissue, wherein the method comprises providing a digital twin of the medical diagnostic system, wherein the digital twin is a computer-implemented simulation of at least part of the medical diagnostic system, and is configured to output digital diagnostic data which approximates diagnostic data generated by the medical diagnostic system as a result of interaction of the high energy particles and tissue in the medical diagnostic system.

According to a third aspect of the invention, there is provided a method of processing data from a medical diagnostic system which comprises at least a suitable detector arrangement configured to detect interaction of high energy particles with tissue, the method comprising:
  receiving diagnostic data associated with interaction of high energy particles with tissue, wherein the diagnostic data is generated as a result of interaction of the high energy particles and the tissue being detected by the detector arrangement of the medical diagnostic system; and
  processing the received diagnostic data with digital diagnostic data generated by a digital twin of the medical diagnostic system, wherein the digital twin is a computer-implemented simulation of at least part of the medical diagnostic system.

According to a fourth aspect of the invention, there is provided a method of processing data from a medical diagnostic system which comprises at least a suitable detector arrangement configured to detect interaction of high energy particles with tissue, the method comprising:
  receiving diagnostic data associated with interaction of high energy particles with tissue, wherein the diagnostic data is generated as a result of interaction of the high energy particles and the tissue being detected by the detector arrangement of the medical diagnostic system; and
  processing the received diagnostic data with a trained machine-based classifier in order to facilitate and/or assist a medical diagnosis, wherein the trained machine-based classifier is trained at least with digital diagnostic data generated by a digital twin of the medical diagnostic system, wherein the digital twin is a computer-implemented simulation of at least part of the medical diagnostic system.

According to a fifth aspect of the invention, there is provided a medical diagnostic system, wherein the system comprises:

a memory storage device; and one or more processors configured to:

generate a digital twin of a real-world medical diagnostic system which comprises at least a suitable detector arrangement configured to detect interaction of high energy particles with tissue, wherein the digital twin is a computer-implemented simulation of at least part of the real-world medical diagnostic system, and is configured to output digital diagnostic data which approximates diagnostic data generated as a result of interaction of the high energy particles and tissue in the real-world medical diagnostic system.

According to a sixth aspect of the invention, there is provided a medical diagnostic system, wherein the system comprises:

a memory storage device; and one or more processors configured to:

provide a digital twin of a real-world medical diagnostic system which comprises at least a suitable detector arrangement configured to detect interaction of high energy particles with tissue, wherein the digital twin is a computer-implemented simulation of at least part of the real-world medical diagnostic system, and is configured to output digital diagnostic data which approximates diagnostic data generated as a result of interaction of the high energy particles and tissue in the real-world medical diagnostic system.

According to a seventh aspect of the invention, there is provided a medical diagnostic system, wherein the system comprises:

a memory storage device; and one or more processors configured to:

receive diagnostic data associated with interaction of high energy particles with tissue, wherein the diagnostic data is generated as a result of interaction of the high energy particles and the tissue being detected by a detector arrangement of a real-world medical diagnostic system; and process the received diagnostic data with digital diagnostic data generated by a digital twin of the medical diagnostic system, wherein the digital twin is a computer-implemented simulation of at least part of the medical diagnostic system.

According to an eighth aspect of the invention, there is provided a medical diagnostic system:

a memory storage device; and one or more processors configured to:

receive diagnostic data associated with interaction of high energy particles with tissue, wherein the diagnostic data is generated as a result of interaction of the high energy particles and the tissue being detected by the detector arrangement of the medical diagnostic system; and process the received diagnostic data with a trained machine-based classifier in order to facilitate and/or assist a medical diagnosis, wherein the trained machine-based classifier is trained a least with digital diagnostic data generated by a digital twin of the medical diagnostic system, wherein the digital twin is a computer-implemented simulation of at least part of the medical diagnostic system.

According to a ninth aspect of the invention, there is provided a non-transitory computer readable medium storing a set of non-transitory computer executable instructions which when executed by one of more processors cause the same to perform any of the methods described herein.

Some features of the different aspects of the invention mentioned above will be described below. It will be appreciated that the features which follow may apply mutatis mutandis to each of the aspects mentioned above.

Facilitating and/or assisting diagnosis may include identifying material/s and/or region/s of interest in the tissue. Based on the identification, a suitable diagnosis may be inferred or determined.

It will be appreciated that the digital twin is configured to output digital diagnostic data which approximates diagnostic data generated as a result of interaction of the high energy particles and tissue in the real-world medical diagnostic system. The tissue may be living tissue.

The method may comprise processing the received diagnostic data with digital diagnostic data by using the digital diagnostic data to improve image reconstruction. Instead, or in addition, the method may comprise processing the received diagnostic data with digital diagnostic data by using the digital diagnostic data to train a machine-based classifier in order to facilitate and/or assist in a medical diagnosis. Similarly, the system, particularly the one or more processors, may be configured to process the received diagnostic data with digital diagnostic data by using the digital diagnostic data to improve image reconstruction. Instead, or in addition, the one or more processors may be configured to process the received diagnostic data with digital diagnostic data by using the digital diagnostic data to train a machine-based classifier in order to facilitate and/or assist in a medical diagnosis.

The method may comprise processing the received diagnostic data with digital diagnostic data by using the digital diagnostic data to improve image reconstruction by comparing the received diagnostic data with the digital data and modifying parameters associated with the image reconstruction process or algorithm. Similarly, the one or more processors may be configured to process the received diagnostic data with digital diagnostic data by using the digital diagnostic data to improve image reconstruction by comparing the received diagnostic data with the digital data and modifying parameters associated with the image reconstruction process or algorithm to arrive at the received diagnostic data. It will be appreciated that the received and digital diagnostic data may be in the form of reconstructed images. However, the similar approach may be used with lower levels of data abstraction. The tomographic algorithm may be a tomographic image reconstruction algorithm. This may be a conventional algorithm.

In this regard, the method may comprise:

a. using the digital twin to generate digital diagnostic data;

b. generating digital image/s from the generated digital diagnostic data, wherein the image/s generated are reconstructed images generated by way of the tomographic algorithm;

c. comparing the generated digital image/s with the digital twin thereby to determine accuracy of the digital images; and d. varying parameters of the tomographic algorithm used for the generating step b. based on the comparing step c. so as to optimise the tomographic algorithm.

It follows that the one or more processors may be configured to:

a. use the digital twin to generate digital diagnostic data;
b. generate digital image/s from the generated digital diagnostic data, wherein the image/s generated are reconstructed images generated by way of the tomographic algorithm;
c. compare the generated digital image/s with the digital twin thereby to determine accuracy of the digital images; and
d. vary parameters of the tomographic algorithm used for the generation step b. based on the comparison step c. so as to optimise the tomographic algorithm.

The digital twin herein may be, for example, a patient with a tumour of a given size.

The method may comprise varying parameters of the digital twin to create a plurality of different digital twins; and performing the steps a. to d. on each of the plurality of digital twins thereby to optimise the tomographic algorithm.

It will be understood by those skilled in the art that the parameters varied may depend on the technique that is being used to perform the reconstruction. Depending on the technique, the parameters and/or decisions to be varied to optimise the tomographic algorithm may be selected from a group comprising:

technique/s to use to bin events in terms of angles and positions,
the number of bins to use in each direction and/or angle degree of freedom
the number of iterations to use for iterative algorithms,
which thresholds to apply on the data.
how much smoothing to apply
which batches of events to consider
which order of batches of events to consider.

In addition, parameter of the digital twin may be varied at one or more of a Numerical algorithm level, Physics Content level, and Geometry/Materials level to facilitate the optimisation of the parameters of the tomographic algorithm as contemplated herein. These may be numerical algorithm parameters.

The digital diagnostic data may approximate diagnostic data as a result of interaction of the high energy particles and tissue in the medical diagnostic system. The diagnostic data may be generated by the medical diagnostic system. For example, the diagnostic data may be generated by the detector arrangement. However, depending on the abstraction level as discussed herein, the diagnostic data may be understood to be the raw signal data from the detector arrangement and/or tomographic images generated from and/or associated with the raw signal data from the detector arrangement. In this regard, it may be said that the diagnostic data is associated with the detection of events from the detector arrangement. The events may be the detection of particles of a predetermined energy level.

In one example embodiment, the digital twin may be configured to simulate pathologies within the human or animal tissue or component under examination. In particular, the digital twin may be configured to simulate interaction of high energy particles with tissue and generate the digital diagnostic data. The digital twin may be configured to simulate interaction of high energy particles with tissue as detected by the detector arrangement of the medical diagnostic system. In other words, the digital twin may be configured to simulate detection of interaction of high energy particles with tissues by way of a detector arrangement so as to generate the digital diagnostic data.

It will be understood that the digital twin may consider the physics processes of the real-world medical diagnostic system in detail, even microscopic detail.

The digital twin may be configured to digitally simulate or model production of a source of high energy particles. For example, the digital twin may be configured to simulate or model an X-ray source or a radiograph or a Computed Assisted Tomography (CAT) scan or a Positron Emission Tomography (PET) source for a PET scan. The CAT scan may be absorption based contrast or phase based contrast for the image formation. As mentioned, the digital twin may be configured to simulate or model radiation from a radiation source in tissue or an externally applied radiation source interacting with the tissue.

The digital twin may be configured to model or simulate interaction of the radiation with the tissue of the human or animal, and then the interaction of the radiation with the detector arrangement. This may be on an event-by-event basis or on an integral basis.

The digital twin may consider in detail the electronic processing of signals within the detector arrangement, including energy detection, pulse time estimation, detector dead time, pulse pile-up, signal amplification, processing delays, coincidence timing, the introduction of electronic noise, characteristic behaviour of specific circuit components, etc.

The simulation or modelling of the human or animal tissue may include an accurate representation of a particular disease, for the purpose of diagnosis or classification based on the analysis of the images. The presence of a disease alters the tissue in a known way and the digital twin may be configured to model or simulate this. The digital twin may be configured to model or simulate the function or the form of the tissue as altered by a particular disease, wherein the digital twin is configured to simulate or modelling either case.

The digital twin may be configured to simulate or model the interaction of radiation (PET source or applied) with the tissues (form or function) as healthy or diseased, dependent on the form of the disease simulated or modelled. The digital twin may therefore be configured to generate differences in final images, as relating back to normal or diseased tissue. The digital twin may digitally construct a plurality of digital versions of patients both healthy and those suffering from disease, as they may present to the medical diagnostic system-. For example, the dimensions, gender, age, internal structure and placement of the organs and other characteristics of the patient would be varied. The digital twin may be configured to generate a multitude of digital versions of patients described herein. The digital twin may be configured to simulate or model different stages of a disease.

In some example embodiments, the digital twin may be configured to simulate or model different coexisting medical conditions for comorbidities. In this way, the digital twin may be configured to provide a training dataset for various roles. These can include a role in developing the improved reconstruction of the images via systematic algorithms and also by machine learning or artificial intelligence algorithms, and it can also be used to train machine learning or artificial intelligence algorithms in the classification of the images, ultimately, the training for the correct medical diagnosis based on the application of these algorithms to the analysis of the images.

The digital twin may be configured to simulate the radiation source in the medical diagnostic system. To this end, the radiation source simulated may be from within the tissue or external to it.

The high energy particles may be photons, electrons, positrons, or the like. The high energy particles may be associated with a radiation source. The radiation source may be an X-ray or gamma ray source, or positron source. The imaging may be one or more of radiography, and tomography. Radiography may be absorption contrast or phase contrast. In this regard, the present invention considers all scenarios where high energy particles or radiation is produced by a source, interacts with the material under investigation and then is detected by a detector, for the purpose of building a quantitative image of function or form of the material under investigation.

The digital twin may be configured to simulate attenuation and scattering of photons emitted from the simulated objects.

The tissue may be human and/or animal tissue. The tissue may comprise organ tissue and may or may not contain undesirable material located therein. The undesirable material may be cancer cells, abnormal tissue, dead cells, pus, or the like.

The method may comprise the prior steps of:
receiving experimental diagnostic data from tissue with an indication of pathologies of tissue with or without undesired material therein;
receiving experimental diagnostic data corresponding to one or both of quantitative and qualitative aspects of pathologies of tissue with or without undesirable material therein; and
using one or both of the received experimental diagnostic data described above to validate the simulations generated by the digital twin by benchmarking the same to the experimental diagnostic data.

The method may comprise:
irradiating the tissue with high energy particles or high energy rays; and
detecting particles of a predetermined energy level emitted by the tissue being irradiated and generating diagnostic data based on the detection of said particles.

It will be understood that the trained machine-based learning classifier may be used to provide or confirm a diagnosis or a pathology. The generation of the trained machined based learning classifier may comprise determining suitable architecture and weighting of the classifier. The digital diagnostic data may be generated by varying parameters of the digital twin and capturing at least digital diagnostic data corresponding thereto. The data indicative of the varied parameters of the digital twin may be linked in a memory storage device with the corresponding resultant digital diagnostic data.

The method may comprise using at least part of the digital diagnostic data to validate the performance of the trained machine-based learning classifier. The method may comprise storing weights and architecture of the trained machine-based learning classifier in a memory storage device. The weights and architecture may be stored in the memory storage device of the system described herein.

The machine-based learning classifier may be in the form of a convolutional neural network. However, it should be noted that the classifier may be other machine-based learning classifiers, for example, those mentioned herein. Moreover, these classifiers may be supervised, weakly-supervised, and un-supervised machine-learning based classifiers.

The diagnostic data may be selected from a group comprising high and low data abstraction levels associated with output signals from the detector arrangement, and wherein the digital diagnostic data is matched to the diagnostic data. The lowest data abstraction level may be raw output signals from the detector arrangement. The highest data abstraction level may be a reconstructed 3D image based on one or more intervening data abstraction levels which effectively are based on the raw output signals from the detector arrangement. In a preferred example embodiment, the raw data may be semi-processed so as to summarise it to reduce its dimension. or not as the case may be.

The method may comprise receiving raw output signals from the detector arrangement and generating one or more higher data abstraction level data to be used as the diagnostic data and computer simulated training data. It follows that the one or more processors may be configured to receive raw output signals from the detector arrangement and generate one or more higher data abstraction level data to be used as the diagnostic data.

The method may comprise pre-processing the generated one or more higher data abstraction level data to improve the quality thereof prior to processing with the trained machine-based learning classifier. The method comprises generating a reconstructed 3D image, based on lower data abstraction levels, which considers attenuation and scattering of photons emitted from the irradiated object. Similarly, the one or more processors may be configured to pre-process the generated one or more higher data abstraction level data to improve the quality thereof prior to processing with the trained machine-based learning classifier.

The diagnostic data may be reconstructed 3D images, wherein the processing of the received diagnostic data with the trained machine-based learning classifier may comprise processing blocks of the 3D images in an overlapping fashion with the trained machine-based learning classifier. To this end, at least one processor may be configured to generate a reconstructed 3D image, based on lower data abstraction levels, which considers attenuation and scattering of photons emitted from the irradiated object. Moreover, the one or more processors may be configured to process blocks of the 3D images in an overlapping fashion with the trained machine-based learning classifier.

Those skilled in the art would understand that the digital diagnostic data may mirror the diagnostic data described herein. The digital diagnostic data may thus be selected from a group comprising simulated raw output data from the detector arrangement of the medical diagnostic system, simulated images from the medical diagnostic system, and simulated reconstructed images from the medical diagnostic system.

The system may comprise or may be part of the real-world medical diagnostic system.

In one example embodiment, the step of processing the received diagnostic data with the digital diagnostic data may comprise evaluating the received diagnostic data and/or the digital diagnostic data by comparing the same to each other.

The method may comprise improving images by accounting for systematic processes and/or effect which cause deterioration of an image. The systematic processes may be one or more from a group comprising attenuation, scattering, system noise, spatial variation of inefficiencies in performance of the detector arrangement, parallax errors, and other systematic effects in performance of the detector arrangement. Conventionally, these systematic processes and/or effects lead to inaccuracies in reconstructed images.

There are various treatments for this, and these procedures may be honed by applying them to the digital diagnostic data generated by the digital twin. This is because it affords the opportunity to generate synthetic data sets which can test these procedures. For example, the images can be generated with a range of statistical significance and noise related artefacts, and the materials and set-up can be altered in order to provide test cases for the treatments of systematic effects such as attenuation and scattering.

Having data from a digital twin where you know the exact source of radiation allows firstly for the honing of the reconstruction algorithm parameters: for example, one could employ a global optimisation algorithm, for example genetic algorithm or simulated annealing algorithm, that explores a landscape created by possible parameters in a reconstruction algorithm, and finds an optimal point in the landscape, where a reconstructed image most closely matches the digital twin. One would then have confidence that if one used the same parameters in an algorithm to reconstruct a patient in a clinical setting, then the resulting image would be as close as possible to the actual patient's physiology.

Moreover, if these processes produce characteristic artefacts that are similar, then a neural network could learn to recognise these artefacts, and remove them from an image. For example, in the PET context, attenuation leads to the suppression of signal within areas that are deep within the subject, as it is more likely that outgoing 511 keV photons for PET imaging are absorbed before they make it to the detectors. Similarly, the signal within areas on the periphery are exaggerated. For complex shapes with different materials and densities, it is hard to create an algorithm to correct for this, but a neural network, given a large data set of correct image types to compare to images with artefacts, would be able to learn to remove them.

The method may comprise processing the received digital diagnostic data with the digital diagnostic data to improve the image reconstruction with deterministic or iterative techniques. This is because one tests the algorithms on the digital twin where the truth is known and one can assess the performance of the models. Specific examples would be to test treatments of the systematic effects of absorption and scattering of the rays in their passage through the tissue. Effectively this may involve a step of comparing a simulated "truth" from the digital twin with reconstructed images to assess reconstruction performance and tune hyperparameters as described herein. In addition, iterative reconstruction may be optimised. This may be similar to deterministic reconstruction, but where iterative reconstruction techniques such as Maximum Likelihood Expectation Maximisation (MLEM) or Ordered Subsets Expectation Maximization (OSEM) or similar techniques are used.

The method may comprise processing the received digital diagnostic data with the digital diagnostic data to improve the image reconstruction with machine learning or artificial intelligence techniques. This is because one tests the algorithms on the digital twin where the truth is known and one can assess the performance of the models. It can involve post image processing algorithms. A large dataset of simulations may be reconstructed, then a generative neural network may be configured to then take the reconstructed image as input, and output an altered image, optimising in such a way as to minimise the difference between reconstructed images and truth as determined by digital simulations.

As described herein but differently stated, there may be many different image reconstruction techniques. Each technique typically may have many parameters that may be adjusted which affect the resulting images. Traditionally, it can be hard to assess the performance of these. Quantitative assessments rely on the fidelity of reconstruction of very simple objects, in idealised situations. Assessment of images from real-world situations are subjective. It is thus not possible to unambiguously differentiate whether any given feature is a true feature of the subject being imaged, an imaging artefact, noise etc., and whether the additional or removal of features improves or degrades image fidelity.

Also as described herein but differently stated, the digital twin disclosed herein may recreate real-world imaging scenarios, including patient and environmental features, physical interactions of radiation with matter. In this regard, electronic processing and image reconstruction can offer the possibility to assess the performance of image reconstruction algorithms quantitatively and objectively. It would also enable automated algorithms to traverse the parameter space for a given reconstruction algorithm, allowing one to find an optimised set of parameters. It also increases the scope for incorporating machine learning algorithms within image reconstruction. These are traditionally limited by the absence of "truth" information from which to learn patterns. However, with the digital twin disclosed herein, the true image characteristics are known.

Moreover, as alluded to herein, the method as described herein may comprise developing algorithms based on machine learning and artificial intelligence. This is for both supervised learning, using classification or feature identification and also for unsupervised learning where one looks for underlying image patterns or feature groupings. In particular, the method may comprise using the digital twin to generate both raw image data and additional set of labels (truth data). As mentioned, the method may comprise simulating or modelling pathologies as part of the digital twin, then training neural networks or other suitable machine-learning models to identify pathologies in reconstructed images.

As mentioned above but differently stated herein, the digital twin may be used to train machine learning and artificial intelligence algorithms in the improvement of reconstructed images. In this use case, a large suite of digital diagnostic data is generated by the digital twin. The variations in digital diagnostic data vary according to patient type (gender, size, physical characteristics), patient orientations, environment surroundings, radiation doses, etc., with the goal of making the digital diagnostic data generated by the digital twin as representative of realistic scanning situations as possible.

In this regard, it will be appreciated that the digital twin may comprise a plurality of different digital twins, wherein each of these digital twins is then used to create one or more sets of digital diagnostic data. These sets of digital diagnostic data may be digitally simulated or modelled sets of detector arrangement readings, and these may be reconstructed to create a suite of 3D tomographic images. A generative neural network then takes each of these images as its input, and creates an altered image as output. Each output is evaluated according to how different it is from the original "truth" information, i.e. the exact known physical characteristics of the digital twin. The neural network then iteratively trains its parameters in order to minimise the differences between the reconstructed and truth images. Image improvements that could conceivably be learnt include:

1. noise reduction
2. identification and improved reconstruction of typical tissue types, features and organs
3. reduction of any systematic image artefacts introduced by the chosen image reconstruction methodology
4. reduction of image artefacts created by physical interactions of radiation with matter, for example, scattering, non-collinearity of PET photons, attenuation of photons, etc.

In summary insofar as the digital twin is concerned, the digital twin of a patient may accurately model or simulate patients with accurate tissue composition and internal structure for an array of body types with and without pathologies including isolated or comorbid cases. The digital twin of the diagnostic system may be integrated with the digital twin of the patient to create high quality images.

BRIEF DESCRIPTION OF THE DRAWINGS

FIG. 2 shows in general a schematic diagram of medical diagnostic and/or imaging system in accordance with an example embodiment of the invention incorporating the system of FIG. 1, wherein:

FIG. 2(a) includes a Positron Emission Tomography (PET) system/assembly, wherein the medical diagnostic system of FIG. 2 is configured to perform PET scans; and FIG. 2(b) includes a Computer assisted Tomography (CAT) system/assembly wherein the medical diagnostic system of FIG. 2 is configured to perform CAT scans;

DETAILED DESCRIPTION OF THE DRAWINGS

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible, and may even be desirable in certain circumstances, and are a part of the present invention. Thus, the following description is provided as illustrative of the principles of the present invention and not a limitation thereof.

It will be appreciated that the phrase "for example," "such as", and variants thereof describe non-limiting embodiments of the presently disclosed subject matter. Reference in the specification to "one example embodiment", "another example embodiment", "some example embodiment", or variants thereof means that a particular feature, structure or characteristic described in connection with the embodiment(s) is included in at least one embodiment of the presently disclosed subject matter. Thus, the use of the phrase "one example embodiment", "another example embodiment", "some example embodiment", or variants thereof does not necessarily refer to the same embodiment(s).

Unless otherwise stated, some features of the subject matter described herein, which are described in the context of separate embodiments for purposes of clarity, may also be provided in combination in a single embodiment. Similarly, various features of the subject matter disclosed herein which are described in the context of a single embodiment may also be provided separately or in any suitable sub-combination.

The headings used herein are for organizational purposes only and are not meant to be used to limit the scope of the description or the claims. For brevity, the word "may" is used in a permissive sense (i.e., meaning "having the potential to"), rather than the mandatory sense (i.e., meaning "must").

The words "include," "including," and "includes" and the words "comprises", "comprising", and "comprises" mean including and comprising, but not limited to, respectively.

Moreover, the term "person" may be understood to include reference to a part of a person, including internal parts such as organs, including tissue associated with the same.

Facilitating and/or assisting in diagnosing diseases as contemplated herein comprises may comprise detecting undesirable material in tissue, detecting damaged tissue, etc.

Figure 1:
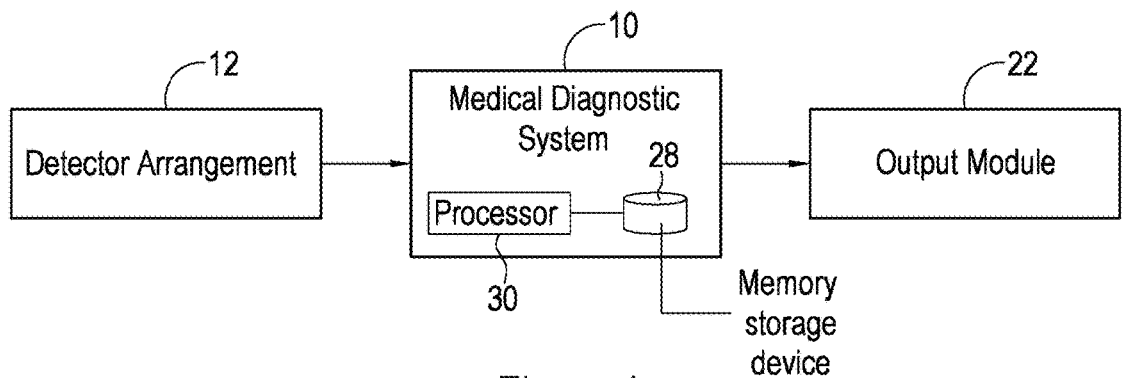
FIG. 1 shows a high-level block diagram of a system in accordance with an example embodiment of the invention.
Figure 2:
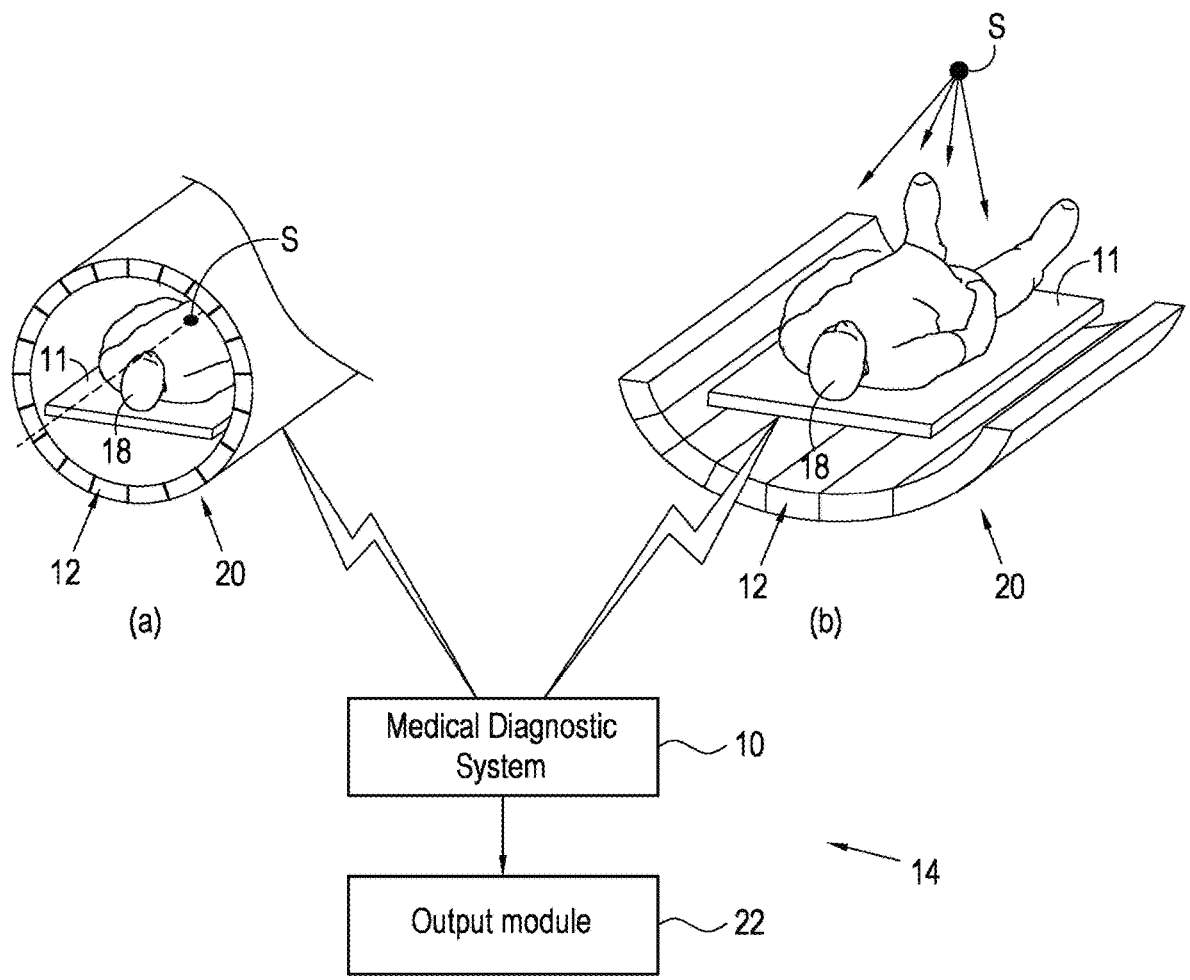

Referring to FIGS. 1 and 2 of the drawings, a system in accordance with an example embodiment of the invention is generally indicated by reference numeral 10. The system 10 is typically a computer system configured to be deployed in medical diagnostic applications which include, inter alia, improving image reconstruction in medical imaging application, and facilitating and/or assisting in diagnosing medical conditions such as diseases, etc. The system 10 may thus be a medical diagnostic system 10.

The system 10 may be a stand-alone system which is configured to simply receive diagnostic data from a detector arrangement 12 associated with a suitable medical diagnostic and/or imaging system 14 and generate outputs as contemplated herein. Instead, the system 10 typically forms part of the medical diagnostic and/or imaging system 14, for brevity, medical imaging system 14, to facilitate diagnosing medical conditions.

The medical imaging system 14 is typically a conventional medical imaging system used to image a human or animal, or part/s thereof for the purposes of generating, or in other words, reconstructing suitable images using conventional iterative image reconstruction algorithms and techniques depending on the type of imaging being undertaken. The system 14 may in general be a diagnostic and/or imaging system 14 which is configured to image or process interactions of high energy particles such as photons, electrons, or positrons from a source of radiation and tissue of a human or animal to facilitate a diagnosis of a pathology in the human or animal, or a part thereof.

As illustrated in FIG. 2(a), the system 14 may include a Positron Emission Tomography (PET) assembly or system 20. The iterative reconstruction algorithms and techniques may therefore be conventional ones such as Maximum Likelihood Expectation Maximisation (MLEM), Ordered Subsets Expectation Maximization (OSEM), or the like.

Instead, or in addition, as illustrated in FIG. 2(b), the system 14 may comprise a conventional X-ray scan, or a Computer Assisted Tomography (CAT) scan assembly or system 21.

The system 14 typically comprises all the components (illustrated or not) of the aforementioned conventional diagnostic and/or imaging systems and as low-level details of these conventional components will not be discussed further.

Notwithstanding, the system 14 may comprise the detector arrangement 12 configured to detect the interaction of radiation with tissue of the person 18 or animal being imaged. The source of radiation S may vary depending on the imaging technique/s implemented by the system 14.

For CAT scans facilitated by the CAT scan assembly or system 21 illustrated in FIG. 2(b), the source of radiation S may be external to the person 18 being imaged and may be radiation applied to the person 18, wherein the detector arrangement 12 detects the interaction of the radiation with the person 18. Similarly, for example, for PET scans facilitated by the PET system 20 illustrated in FIG. 2(a), the source of radiation S may be internally located in the person 18 and is emitted from the body of the person 18, wherein the detector arrangement 12 detects the interaction of the radiation with the person 18 as it radiates from the person 18. In particular, in the PET system 20, the detector arrangement 12 is configured to detect PET photons emitted from the person 18 in a conventional manner. For ease of explanation, reference to the different systems 20, 21 may be indicated by the use of the terms "PET" and "CAT" herein.

For ease of explanation, unless otherwise indicated, reference will be made primarily to the system 10, 14 being applied to PET medical imaging systems 20. However, it will be understood that the teachings contained herein insofar as it relates to PET medical imaging systems 20 may be understood by those skilled in the art to extend to other imaging systems, for example, the X-ray scans, and CAT scans mentioned herein, mutatis mutandis. Notwithstanding, where applicable, reference is made to the other applications.

The system 14 generally includes a displaceable, or stationary platform 11 in which a person 18 may rest. The detector arrangement 12 may be a conventional PET detector arrangement in the form of a suitable tunnel having one or more detectors configured to detect PET photons emitted from the person 18.

For CAT scans or X-rays, the detector arrangement 12 may be similar but may be provided as an arcuate or planar arrangement which is configured to operatively face both the person 18 and the source S in a manner wherein the arrangement 12 and the source S flank the person 18 in a sandwich-like fashion as can be seen in FIG. 2(b).

Figure 3:
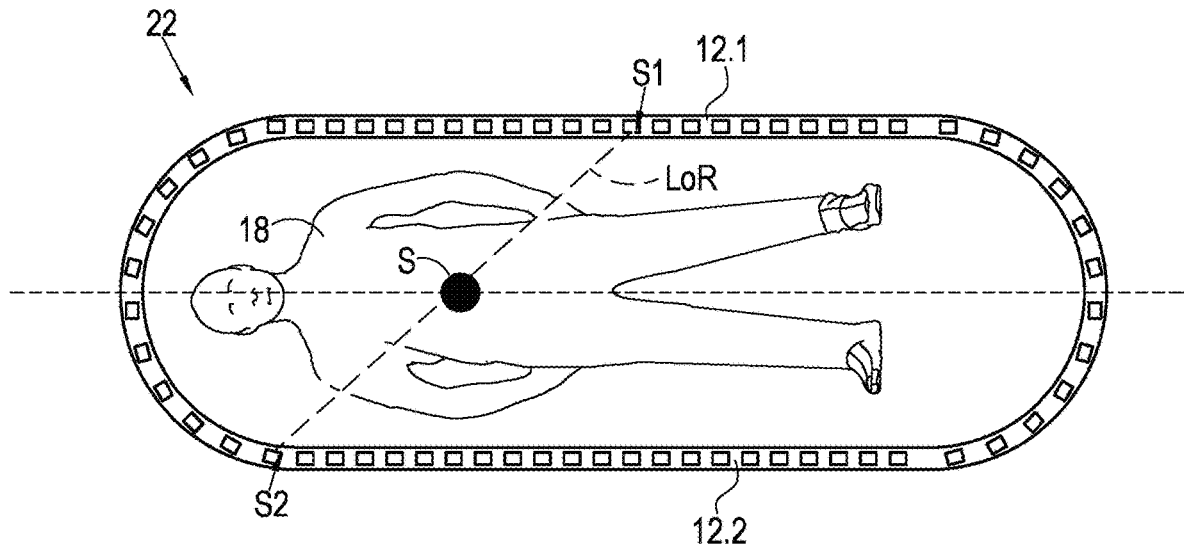
FIG. 3 shows an illustration of a human subject in a detector arrangement of the medical diagnostic system of FIG. 2, in use.

In one non-limiting example embodiment, as illustrated in FIG. 3, the detector arrangement 12 may comprises a pair of detector arrays 12.1 and 12.2 which are provided in an opposed fashion relative to the person 18 and/or the platform 11. The arrays 12.1, 12.2 have sensing axes which are substantially transverse to a length of the body of the person 18. In the example embodiment, wherein the arrangement 12 encases or encloses the patient 18 (as illustrated in FIG. 2(a), the arrays 12.1, 12.2 may suitably be provided as a pair of semi-circular arrays with sensing axes between the pair of arrays traversing a volume of the enclosure, transverse to the length of a patient 18 and/or the platform 11. As mentioned, the detector arrangement 12 comprises detectors suitable for detecting PET photons. In this regard the detectors of the arrangement 12 may be in the form of scintillator crystals and photomultiplier tube (PMT) detectors with suitable electronics (not shown).

The system 14 also comprises a suitable output module 22 which be in the form of a suitable display arrangement, for example a suitable screen or monitor, configured to display the images generated in a manner described herein. Instead, or in addition, the output module 22 may comprise a suitable printer for printing images generated and/or any other pertinent information. Instead, or in addition, the output module 22 may comprise a suitable communication module to transmit the image generated in the manner described herein. The module 22 may be an input/output module and as such may facilitate a user such as a medical professional interacting with the system 14.

The system 10 as described herein is communicatively coupled to the detector arrangement 12 and to the output module 22 so as to receive diagnostic data from the detector arrangement 12 and to generate suitable output signals to the module 22.

The system 10 may be coupled to the arrangement 12 and/or the module 22 in a hardwired fashion, or in a wireless fashion. In one example embodiment, the system 10 is communicatively coupled to the arrangement 12 via a communications network which may comprise one or more different types of communication networks. In this regard, the communication network may be one or more of the Internet, a local area network (LAN), a wide area network (WAN), a metropolitan area network (MAN), various types of telephone networks (e.g., Public Switch Telephone Networks (PSTN) with Digital Subscriber Line (DSL) technology) or mobile networks (e.g., Global System Mobile (GSM) communication, General Packet Radio Service (GPRS), Code Division Multiple Access (CDMA), and other suitable mobile telecommunication network technologies), or any combination thereof. It therefore follows that though it may not necessarily be practical, it is envisaged that in some example embodiments, the system 10 need not be at the site of the imaging system 14.

In any event, the system 10 may comprise a memory storage device 28 and a processor 30 configured to perform various data processing steps as described herein. The processor 30 may be one or more processors in the form of programmable processors executing one or more computer programs to perform actions by operating on input data and generating outputs. The processor 30 as well as any computing device referred to herein, may be any kind of electronic device with data processing capabilities including, by way of non-limiting example, a general processor, a graphics processing unit (GPU), a digital signal processor (DSP), a microcontroller, a field programmable gate array (FPGA), an application specific integrated circuit (ASIC), or any other electronic computing device comprising one or more processors of any kind, or any combination thereof. For brevity, any functionality described as being performed by the system 10 may be functionality which is effectively performed by the processor 30 and vice versa unless otherwise indicated.

The memory storage device 28 may be in the form of computer-readable medium including system memory and including random access memory (RAM) devices, cache memories, non-volatile or back-up memories such as programmable or flash memories, read-only memories (ROM), etc. In addition, the device 28 may be considered to include memory storage physically located elsewhere in the system 10, e.g. any cache memory in the processor 30 as well as any storage capacity used as a virtual memory, e.g., as stored on a mass storage device.

Though not illustrated, it will be appreciated that the system 10 may comprise one or more user input devices (e.g., a keyboard, a mouse, imaging device, scanner, microphone) and one or more output devices (e.g., a Liquid Crystal Display (LCD) panel, a sound playback device (speaker), switches, valve, etc.). These may form part of or may be separate from the output module 22.

The computer programs executable by the processor 30 may be written in any form of programming language, including compiled or interpreted languages, declarative or procedural languages, and can be deployed in any form, including as a stand-alone program or as a module, component, subroutine, object, or other unit suitable for use in a computing environment. The computer program may, but need not, correspond to a file in a file system. The program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). The computer program can be deployed to be executed by one processor 30 or by multiple processors 30, even those distributed across multiple locations.

The computer programs may be stored in the memory store 28 or in memory provided in the processor 30. Though not illustrated or discussed herein, it will be appreciated by those skilled in the field of invention that the system 10 may comprise a plurality of logic components, electronics, driver circuits, peripheral devices, etc. not described herein for brevity.

The processor 30 is configured/programmed to receive diagnostic data from a diagnostic data source in one or more data abstraction levels as will be described below. Moreover, and more importantly, the system 10 and particularly the processor 30 is configured to facilitate and/or support diagnosis of the patient 18 as described herein. Instead, or in addition, the system 20 and particularly the processor 30 is also configured to improve quality of reconstructed images generated by the imaging system 14 in a conventional fashion as described herein.

The diagnostic data received by the processor 30 is typically associated with photons detected by the arrangement 12 which are emitted from object as a result of positron annihilation in the body of the person 18. In particular, when a PET isotope in the body of the person 18 releases a positron particle through beta-decay, the positron annihilates with a nearby electron after following a short path that can involve multiple scattering events. The most common outcome of this annihilation is the production of nearly co-linear back-to-back 511 keV gamma ray photons. These co-linear back-to-back 511 keV gamma ray photons are detected by the detector arrangement 12. Each photon then travels through the surrounding tissue, sometimes changing energy and direction along the way. When the photons reaches the detector arrangement arrays 12.1, 12.2 at S1, S2, the arrangement 12 outputs diagnostic data in the form of detector strike/hit event data, for example, which comprises data indicative of the location of the hit on the array 12.1, 12.2, and the energy of the photon.

As mentioned above, and with reference to FIG. 4 of the drawings, the term "diagnostic data", as described herein may be considered to include any data associated with outputs from the detector arrangement 12 in response to photons of interest being incident thereon/detected thereby. The term "digital diagnostic data" may be substantially similar to the diagnostic data albeit simulated by the digital twin contemplated herein and thus the comments pertaining to the digital data may be extended to the digital diagnostic data. It follows that the diagnostic data may be selected from a group of different levels 23.1.23.5 of data abstraction as illustrated FIG. 4, wherein each level 23.1 . . . 23.5 are associated with the photons detected by the arrangement 12.

The diagnostic data may be selected from a group comprising of data indicative of gamma ray strikes/hit events on the detector arrangement 12 23.1, lines of response (LoR) 23.2, 4D projections 23.3, 3D images 23.4, and image features extracted from the images 23.5. It will be understood that the 4D projections are essentially 4D data, being 2D sets of 2D projections.

Figure 4:
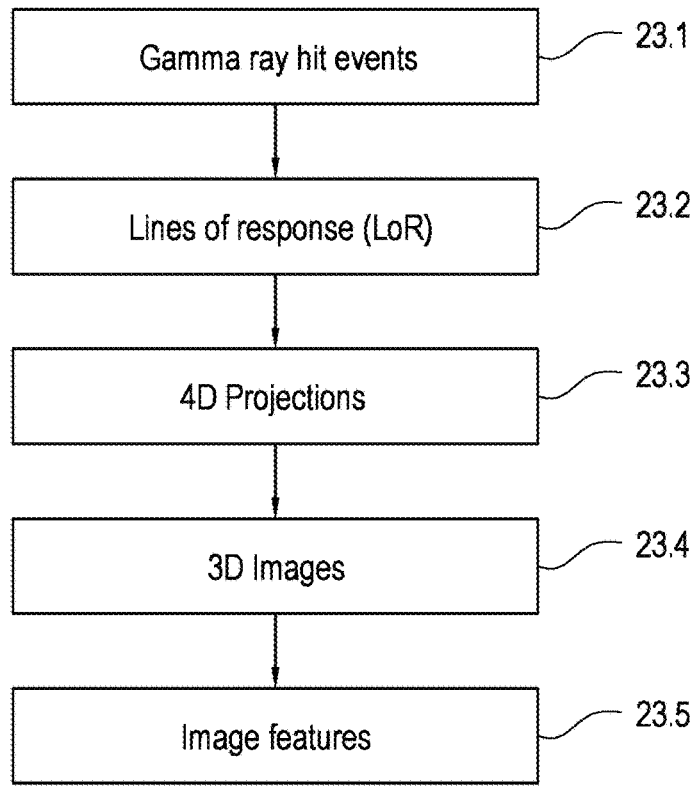
FIG. 4 shows block diagram of the various levels of the abstraction of the diagnostic data in accordance with an example embodiment of the invention.

As described above, the processor 30 may be configured to receive any type diagnostic data described herein from the detector arrangement 12 including: diagnostic data in the form of raw signal data from the arrangement 12 in which the arrangement 12 is the diagnostic data source, and higher-level data abstraction level diagnostic data from one or more pre-processing system/s and/or computing devices as described in FIG. 4. To this end, though the processor 30 is illustrated in FIGS. 1 and 2 to be coupled directly to the detector arrangement 12, nothing precludes the processor 30 from simply receiving the outputs of the detector arrangement 12 indicative of detected photons in any level of data abstraction described in FIG. 4 from a suitable diagnostic data source in the form of the pre-processing system/s and/or computing devices, or the like. In a preferred example embodiment, the diagnostic data, and the associated digital diagnostic data is in the form of one or more of 4D Projections 23.3, 3D images 23.4, and image features 23.5 associated with photons detected by and/or incident on the detector arrangement 12.

The description which follows pertaining to the diagnostic data of various data abstraction levels need not be limited to interpretation as being done by the processor 30 as the processor 30 may generate the diagnostic data in the fashion described below or may simply receive the diagnostic data as input data thereto from a suitable data source as the case may be to perform the diagnosis contemplated herein.

Referring again to FIG. 3, in case where diagnostic data is in the form of lines of response (LoR), hit events/strikes on the detector arrays 12.1, 12.2 define a line of response (LoR) which is the line that connects the two hit locations S1 and S2. It will be appreciated that though the LoR herein may be specific to the system 14 comprising a PET imaging system 20 as illustrated in FIG. 2(*a*). A ray or line or straight path from source S to detector arrangement 12 may be the associated equivalent in example embodiments when the system 14 comprises a CAT scan or X-ray system 21 as illustrated in FIG. 2(*b*). In this way, just as one has LoRs in PET one will have similar reconstructed Rays in CAT scans/X-rays.

Then, just as one has 2D sets of 2D projections equivalent to a 4D data set in PET, so will one have in the general most complex case of CAT. Moreover, just as in PET these can be reduced to a 3D image, the same again for CAT. In both cases one could extract 2D slices where one wanted, and in both cases one could get meta-data which is only a few or several parameters which describe features extracted from the images.

In the case where diagnostic data received by the processor 30 is in the form of many 2D projections from a 4D sets as described above, the LoRs are grouped into families with the same spatial direction (a given set of two spherical coordinate angles (θ,φ)). For each family, the LoR intersections with a 2D plane located midway between the detector arrays 12.1, 12.2 form a 2D projection. All 2D projections of the type described make up a single 4D sinogram. The plurality of LoRs may be used to create a back-projection.

However, the unfiltered back-projection may not the best form of diagnostic data to use as it suffers from a distortion where each voxel is effectively convoluted with an approximately inverse square function of distance. It is therefore preferable to reconstruct the original source point density distribution. To this end, in the case where the diagnostic data is in the form of 3D images, iterative 3D tomography is employed which makes use of a Maximum Likelihood Estimation Method (MLEM) algorithm, or any other iterative reconstruction algorithm, to reconstruct an image of the source point density distribution using the set of 2D projections (sinogram).

The 3D image created from the processing of the sinogram described herein to a PET reconstructed image should ideally reflect the original PET isotope source point density distribution. Two effects are very important to treat in this respect. These are the attenuation and scattering of the two back-to-back co-linear and co-incident 511 keV photons as they travel through the tissue of the person 18. This effect means that typically only 3% of the photons are usable in the LoR construction process. The attenuated photons are lost and the scattered photons lead to a false LoR reconstruction. The size of the effect is dependent on the local geometry of the PET isotope.

When on average the path length of LOR in the body 18, then the effect is stronger. An algorithm is used to treat the effects of attenuation and scattering in the PET image reconstruction, so that the systematic effects of attenuation and scattering do not lead to a mismatch between the actual distribution of PET isotope source points and the reconstructed one as described.

The system 10 advantageously may be configured to process diagnostic data received from the system 14, particularly the detector arrangement 12, with a suitable machine-learning based classifier so as to facilitate and/or assist diagnosis of the person 18 being operated on by the system 14. "Operated on" in the context here may be the radiation-tissue interaction of the person 18 as detected by the arrangement 12 of the system 14. The machine-learning based classifier is typically trained with digital diagnostic data generated by a suitable digital twin of the system 14.

To this end, the system 10, particularly the processor 30 may be configured to generate and/or implement a digital twin of the system 14. However, the digital twin may be implemented by other processing systems (not shown) but the resultant generated digital data is used by the processor 30 in the manner contemplated in herein.

In any event, it will be understood that the digital twin is a computer-implemented simulation/digital twin which simulates the system 14, the person 18, and the interaction between the system 14 and the person 18 during medical imaging procedures and enables variation of parameters of the system 14 which produces digital diagnostic data. The digital diagnostic data may be artificially generated data from the digital twin.

It will be understood that in a preferred example embodiment, the digital twin is based on close computer-based or computer-implemented modelling or simulation of the real-world system 14, from the source of radiation (either from a body of a person 18 as in the case of PET imaging or external as in the case of CAT scans), detection by the detector arrangement 12, right through to modelling or simulating a range of varied patients with or without disease pathologies (at various stages of disease), as well as the generation of the diagnostic data (which may be raw detector data or higher abstraction levels as contemplated herein).

The modelling or simulating referred to herein uses a sufficiently accurate physics and engineering description of this process. In some example embodiments, the digital diagnostic data is then benchmarked with experimental data and/or real-world data.

In one example embodiment, generation and/or implementation of the digital twin, i.e., the computer-based or computer-implemented modelling or simulation of the digital twin may be achieved by way of at least software to model subatomic particle processes and various particle detector geometries known as Geant4 which is used by various research groups including those at the Large Hadron Collider at the European Organization for Nuclear Research (CERN). This is a C++ toolkit used by researchers to simulate particle histories and the behaviour of the detector arrays used to study these histories.

The computer simulation performance in accuracy to the real situation is very carefully benchmarked in experiments or experimental data under very similar conditions. The advantage is that much fewer experiments need to be performed compared to a full experimental production of the training data.

In one example embodiment, the digital twin is based on the Monte Carlo technique benchmarked to a small experimental data set. As mentioned, the full physics of PET from the initial activation of the PET activity in the material by a photon beam at the energy of the Giant Dipole Resonance (GDR), to the registration of the primary signal in the detector arrangement 12 is used, in of course the simulation. In some example embodiments, the modelling or simulation may comprise modelling or simulating direct PET activation of a patient 18 or of a tracer (like sugar) in the patient 18. In some example embodiments, the patient 18 is "activated" by exposing the same to activation radiation from a radiation source configured to "activate" the patient so that suitable PET isotopes to be detected in a manner contemplated herein. This would allow access to a wider range of isotopes with shorter lifetimes and other isotopes (Carbon, Nitrogen and Oxygen) thus a wider range of tissue, forms, functions, and then also time scales for dynamics.

The detector hits lead to the construction of Lines of Response (LoR) as mentioned above with reference to FIG. 3. A back projection may be assembled as a 3D image from the LoRs. The LoRs may also be binned into a 4D sinogram, as a set of transverse (x,y) projections for a set (θ,φ) of angles. The sinogram can be converted to a PET reconstruction as a quantitative 3D image of source points by a variety of techniques known in the art as described herein which finds the most likely original 3D source point density.

With digital diagnostic data generated by the digital twin, one knows the truth, which means, one knows the full details of the system 14 being simulated, the person being simulated, tissue (including or excluding undesirable material therein such as cancer cells, pus, damaged tissue, etc.) being simulated, interaction in the system 14 between the tissue and the radiation being simulated, and digital diagnostic data in the form of data from the detector arrangement 12 being simulated. Thus the digital diagnostic data generated by the digital twin may be used for improving image reconstruction as described herein and facilitating and/or assisting in diagnosing diseases.

In particular, the digital twin, particularly the digital diagnostic data generated thereby, may be used by the processor 30 to improve the image reconstruction with deterministic or iterative techniques. This is because one tests the algorithms on the digital twin where the truth is known and one can assess the performance of the models. Specific examples would be to test treatments of the systematic effects of absorption and scattering of the rays in their passage through the tissue. Effectively this involves the comparison of simulated "truth" with reconstructed images to assess reconstruction performance and tune hyperparameters. In addition, iterative reconstruction can be optimised. This is similar to deterministic reconstruction, but where iterative reconstruction techniques such as Maximum Likelihood Expectation Maximisation (MLEM) or Ordered Subsets Expectation Maximization (OSEM) or similar techniques are used.

The digital twin, particularly the digital diagnostic data generated thereby, may be used by the processor 30 to improve the image reconstruction with machine learning or artificial intelligence techniques. This is because one tests the algorithms on the digital twin where the truth is known and one can assess the performance of the models. It can involve post image processing algorithms. A large dataset of simulations are reconstructed in this fashion. Then a generative neural network can then take the reconstructed image as input, and output an altered image, optimising in such a way as to minimise the difference between reconstructed images and truth.

Lastly, the digital twin, particularly the digital diagnostic data generated thereby, may be used by the processor 30 to develop algorithms based on machine learning and artificial intelligence. This is for both supervised learning, using classification or feature identification and also for unsupervised learning where one looks for underlying image patterns or feature groupings. One would use the digital twin to provide both the raw image data and the additional set of labels (truth data). An important goal is pathology identification: simulate pathologies as part of the digital twin, then train neural nets to see these pathologies in reconstructed images.

In this regard, in one example embodiment, the digital diagnostic data generated by the digital twin may be segmented into a training and a validation dataset as will be described below. In principle, the simulated digital diagnostic dataset can be large, as high-performance computing techniques can be used to generate it offline. The dataset can be validated by selected experiments to benchmark the computer simulation at a variety of points that explore the full parameter space of the system 14. The point is that much fewer experiments (or clinician interventions to label images with the truth) are necessary than if the full training and validation data set was done by experiment alone. This is an important aspect of the invention described herein as it is important to have very large data set where the truth is known, which can be divided into the training and validation data sets.

In summary, the computer simulated digital diagnostic data is obtained by varying the aforementioned parameters of the digital twin of the system 14 and obtaining suitable digital diagnostic data. The digital diagnostic data generated with varied parameters of the digital twin provides the system 10 with a robust training, and validation dataset, which therefore optimises the performance of the classifier described herein which enables more reliable diagnosis in the system 14.

It will be understood by those skilled in the art that the digital diagnostic data obtained from the digital twin and described herein, as well the diagnostic data received by the processor 30, in use, may correspond mutatis mutandis to any of the data abstraction levels contemplated herein with reference to FIG. 4.

In any event, as mentioned, the processor 30 is typically configured to implement and/or use a trained machine-based learning classifier as described herein, to be able to facilitate and/or assist with a diagnosis based on received diagnostic data from the system 14, particularly the detector arrangement 12. The classifier is trained at least with digital diagnostic data from a digital twin.

In this way, the system 10 addresses the problem of requiring large datasets of real-world diagnostic data for the purposes of training the classifier in accordance with the invention. If not for the training data being digitally generated, it would not be practically feasible to acquire a large amounts of diagnostic data experimentally for this training especially where there is prior knowledge of the truth.

Moreover, the training diagnostic data for the classifier needs to be representative of a large variety of cases where the properties of the person 18, disease pathologies, etc. are to be varied in a parameter space.

As to varying parameters of the detector arrangement 12, the digital twin may be configured to vary parameters relating to detection limits, interrogating power, configuration of the sensors in terms of thresholds, array types and geometries, electronic processing capacities, sensitivities to various materials or emanations from these materials, and the like.

The statistical quantity of information gathered is another parameter, relating to the power of the system 14, etc. The training data therefore typically contains a very large number of elements. It is therefore generally not efficient to manually create a data set.

The classifier may conveniently be any artificial intelligence (AI) classifier. The term "classifier" may therefore be used interchangeably with "AI" herein.

The classifier may be selected from a group comprising a Decision Tree Classifier, Random Forest Classifier, Ada Boost Classifier, K-Nearest Neighbors Classifier, a Support vector machine, Quadratic Discriminant Analysis, Gaussian Process Classifier, a Multi-layer Perceptron Classifier, preferably a Convolutional Neural Network. Notwithstanding, it will be noted that other machine learning classifiers may be used in the present invention.

It will be noted that the training of the classifier may be to obtain the initial weightings and architecture of the classifier and the validation may be so as to confirm the accuracy of the training and/or re-configure/tune the architecture and/or weightings of the classifier.

Though many types of classifiers of the type described above may be used for the purposes of classifying the invention, the present invention preferably makes use of Multi-Layer Perceptron (MLP) classifier and particularly a Convolutional Neural Network (CNN) based classifier as the other classifiers have not achieved the same level of performance as the preferred classifiers during experimentation.

In one example embodiment, the MLP classifier with one hidden layer and approximately five perceptrons may be trained with diagnostic data in the form of image features as described above.

In a preferred example embodiment, the classifier is a deep-learning network for image object identification in the form of a convolutional neural networks (CNN). The CNN classifier uses various convolution layers as well as other complex perceptron layers such as pooling layers to learn how to identify image features such as edges, bright spots, degree of image uniformity among others. In one example embodiment, the CNN classifier is used to facilitate and/or assist diagnoses within received diagnostic data in the form of reconstructed images. Images of disease free tissue, and diseased tissue of various types are learnt by the CNN classifier in order to perform accurate classifications.

It will be noted that the CNN classifier is preferable as it accepts low data abstraction inputs (images and possibly others such as LoR and projections) whereas others operate on very high data abstraction which may lose important diagnostic data information present in the lower levels.

Moreover, the CNN classifier self-discovers pattern matching and image features to use as opposed to other methods. In this way more sophisticated AI can discover representations of the original data at higher levels of abstraction. This can happen at depth, meaning it can do this representation discovery over several layers. These new representations are expected to extract essential features of the data which are sensitive to complex aspects of the decision making.

Also, the CNN is advantageous in that once it is trained and the model (weights and architecture) saved to file, it may be recalled for use on experimental or more validation data. A classifier such as a K-nearest neighbours requires the entire training data set to be stored in RAM so that it can be used for classification.

The CNN classifier is trained to analyse a region around material of interest in the tissue, and not just the material itself. In this way, a trained CNN classifier is able to analyse the materials identified in the context of its background.

For the 3D image, the classifier recognises potential disease in 3D (whereas a human would do this on a 2D image), and in the LoR case, the classifier would do this in 4D. In this regard, the present invention enables facilitating and/or assisting in diagnoses of diseases in a manner which is beyond a human inspection of the data.

In one example embodiment, a CNN classifier is configured to internally learn about image attenuation and other photon effects to create more accurate improved images which are used for the classifications as alluded to above. The improved imaging would be within the CNN classifier so in terms of input and outputs: sensor data→initial imaging→CNN (doing internal attenuation/scattering correction to create internal high-quality images)→classification.

Instead of using the highly abstract reconstructed image data, input data with lower abstraction can be used to train the CNNs from using raw LoR data to using only 4D sinograms.

Referring now to FIGS. 5 to 8 of the drawings where flow diagrams of methods in accordance with example embodiments of the invention is generally indicated by reference numerals 40, 32, 50, 60 respectively. The examples methods 40, 50, 32, 60 may be described, in a non-limiting example, in use with systems of the type described in FIGS. 1 and 2, but nothing precludes the method 40, 32, 50, 60 from being used in other systems not illustrated. Notwithstanding, the features of the system 10 may be exemplified based on the discussion of the FIGS. 5 to 8 as a majority of these steps are performed by the processor 30, in use.

Figure 5:
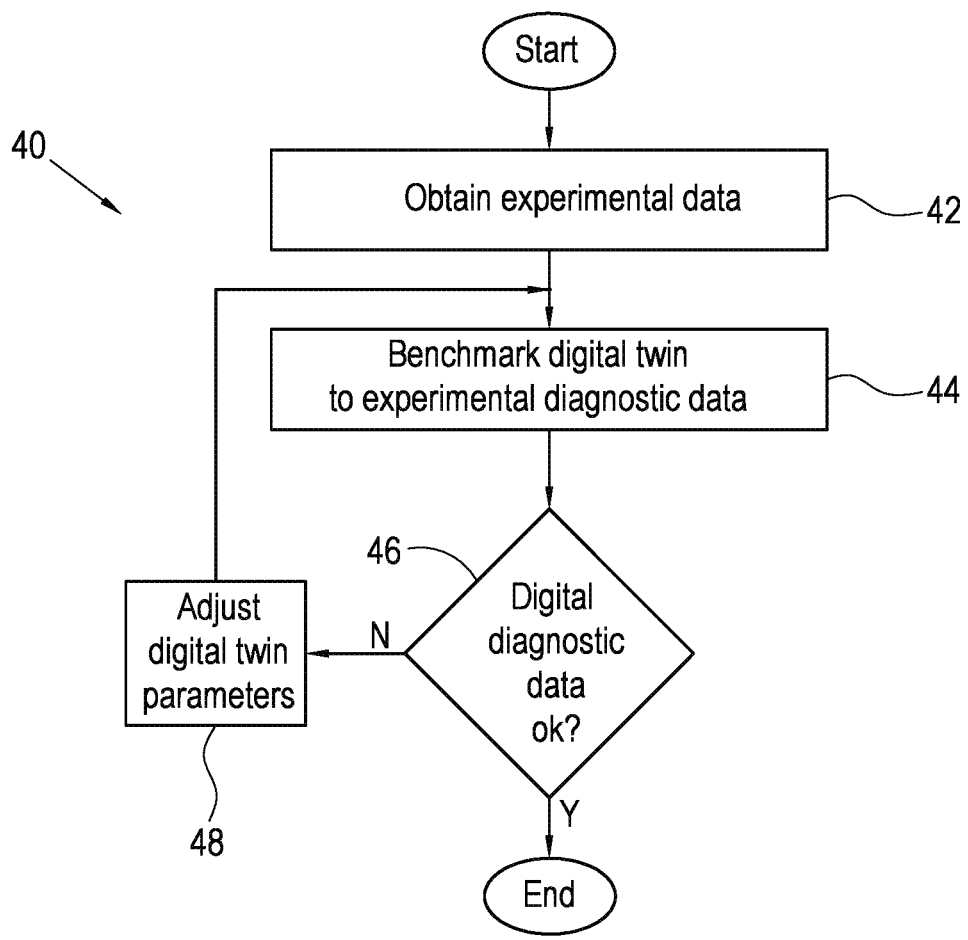
FIG. 5 shows a high-level flow diagram of a method for generating the computer-implemented digital twin in accordance with an example embodiment of the invention.

Referring to FIG. 5 of the drawings where the flow diagram of the method 40 is shown. The method 40 typically entails the generation of the computer-implemented simulator or model, in other words, a digital twin of the system 14 of a type as herein before described. It will be appreciated that the generation of the digital twin may be achieved in an offline manner and typically as a prior process. The iterative development of the digital twin with comparisons to real-world data serves the purpose of successive cycles of development, validation and benchmarking of the performance of the digital twin cross-checked to real-world data.

The method 40 generates the simulator or model using the Geant4 software as well as Monte Carlo techniques as described above to simulate or provide a simulated model of the physics behind the detection associated with the interaction of radiation and tissue in the system 14 as herein before described.

The generation of the simulator may entail computer-implemented simulating/modelling various physical parameters associated with the system 14, patient/person 18, disease propagation in tissue, and the like. In one example embodiment, the detector arrangement 12 response as a result of interaction of radiation with human tissue with gamma rays as herein before described is also simulated.

The method 40 then includes obtaining experimental data, at block 42, which may be by obtaining medical training data and/or performing experiments by actually subjecting people 18 to gamma rays of the type described above. Instead, this data may be taken from historic sources of data.

The method 40 then comprises benchmarking the generated digital twin, to the obtained experimental data, at block 44. This may be achieved by conventional benchmarking techniques which effectively compares the performance of the simulator with the real-world experimental data. To this end, the step of benchmarking may be effectively to validate that the simulator is in fact producing simulations or output data such as computer generated/simulated diagnostic data which corresponds to what one would expect in the real-world, at block 46.

If the simulated data does not correspond to experimental data, the similar parameters, or in other words the simulator or model details, are tuned and adjusted, at block 48, until the digital twin and/or the digital diagnostic data is acceptable. The validation of the digital twin is therefore an important process in that it increases the confidence in the outputs of the simulation which include computer generated diagnostic data for training as described herein.

Figure 6:
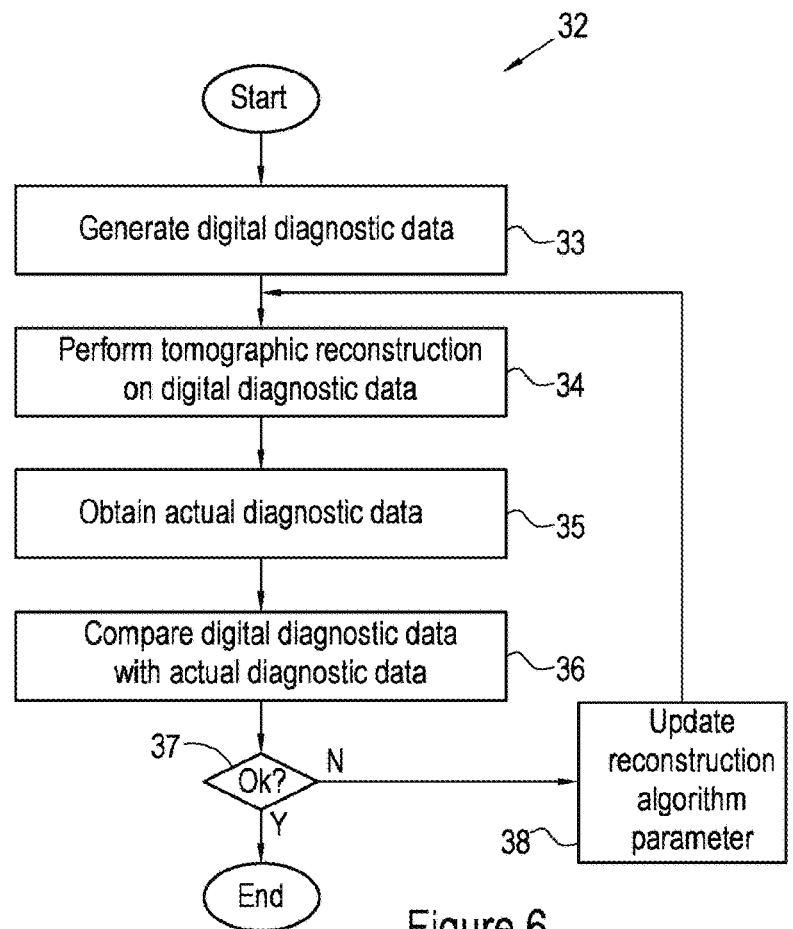
FIG. 6 shows a flow diagram of a method of improving tomographic images in accordance with an example embodiment of the invention.

Referring to FIG. 6 of the drawings where the flow diagram of the method 32 is shown. The method 32 typically shows an example method of improving tomographic reconstruction algorithm parameters. In particular, by way of the digital twin and the digital diagnostic data generated thereby. This serves the purpose of using the successfully developed, validated and benchmarked digital twin, for example, as derived from the method 40 above, to improve the process of image reconstruction for the real-world diagnostic system 14. That is to say, the same process is implemented in the digital twin, except here the "truth" is known. This advantage enables the image reconstruction algorithm to be iteratively improved. In this case, the focus is on deterministic type algorithms that improve the accuracy of the image reconstruction system.

The method 32 comprises generating, at block 33, digital diagnostic data in the form of digital detector output data from a simulated detector arrangement from the digital twin.

The method 32 comprises performing tomographic reconstruction (or similar reconstruction on raw data to produce the image), at block 34, on the simulated digital diagnostic data in step 33 to generate a reconstructed image based on the digital diagnostic data. A predetermined algorithm may be used for this step, for example, a conventional reconstruction algorithm. It will be understood that in some example embodiments, the digital twin may be configured such that the abstraction level which it simulates is relatively high and as such the digital twin may simply generate reconstructed images as the digital diagnostic data contemplated herein using the predetermined algorithm.

The method 32 comprises receiving or obtaining, at block 35, actual real-world diagnostic data associated with the system 14. The level of abstraction of this data may be high, for example, performing the comparison at any of the levels of abstraction 23.2 through to 23.5 as shown in FIG. 4 as deemed effective for this goal. The details to be compared may be selected in order to benchmark and validate ultimately the image reconstruction performance. The type of source data used to generate the simulator can be modified to highlight specific areas of interest in this improvement of the image reconstruction process.

The method 32 may then comprise comparing, at block 36, quantitatively specific features which are necessary to bring contrast and clarity to the image, insofar as the image must enable ultimately a classification or a diagnosis (by either an AI or a trained clinician). Essentially, the features associated with the effect of a pathology or disease must be clearly visible. Systematic effects, statistical effects, inadequacies in resolution, performance, dynamic range in image contrast in response to factors leading to the classification or diagnosis may be controlled in such a way that the image is appropriately optimised. Often the source of these defects in the image formation is ambiguous. Having access to a digital twin allows one to vary specific input or included details in the simulation (control the physics, geometries, materials, processes) in such a way as to clearly identify the worst culprits (effects) that lead to deterioration in final image quality. These can then be addressed, or changes implemented, as part of the development cycle. Though algorithmic processes in the image formation are dealt with herein, nothing precludes the use of AI processes to improve the image formation contemplated herein. In short, the method 32 may comprise comparing, at block 36, the actual reconstructed image from step 35 with the reconstructed image from the digital twin, from step 34.

If the comparison result is acceptable, at block 37, nothing further is done. However, if the comparison result is not acceptable, at block 37, the results of the comparison in step 36 are used to update parameters, at block 38, in the predetermined tomographic reconstruction algorithm.

Figure 7:
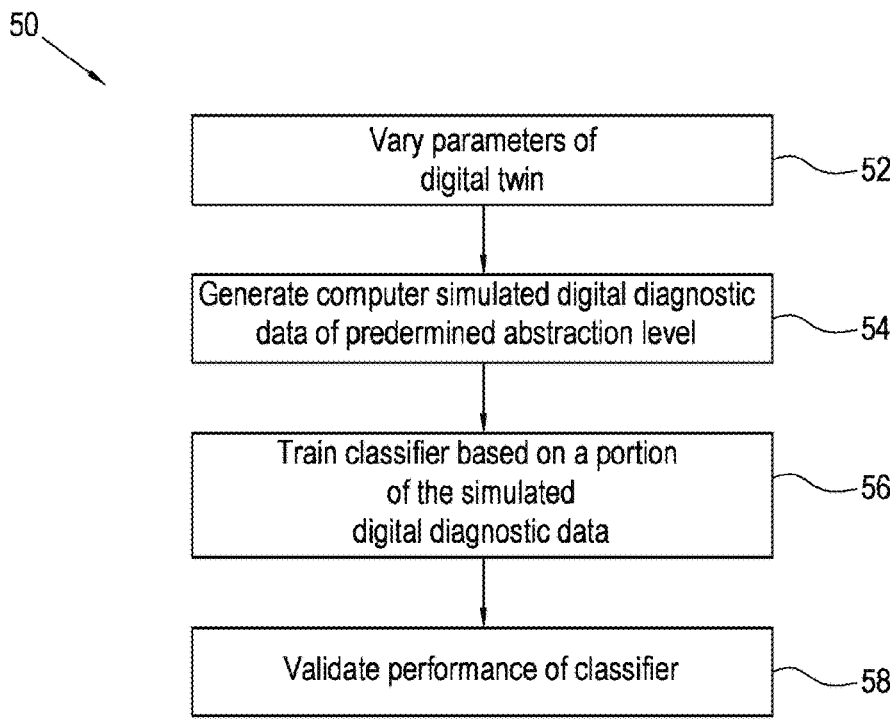
FIG. 7 show another high-level block flow diagram of a method for training a machine-based learning classifier in accordance with an example embodiment of the invention.

Referring now to FIG. 7 of the drawings where a block flow diagram of a method 50 is illustrated. The method 50 is generally a method for generating a trained classifier for the improvement of the reconstructed images in accordance with an example embodiment of the invention, for example, a classifier as implemented by the processor 30 as described above. This may be an advance of the previous FIG. 6 and method 32 disclosed herein, in that in this case, the focus is on machine-based learning processes that improve the accuracy of the image reconstruction process.

The method 50 comprises varying, at block 52, parameters of the digital twin in a random fashion, within predetermined tolerances to avoid errors, and generating computer generated/simulated digital diagnostic data of a predetermined data abstraction level (one or more of the levels described with reference to FIG. 4), at block 54.

As mentioned above, this step entails digitally varying of the parameters of the system 14, person 18, and pathologies in the person 14. The varying of the parameters of the digital twin effectively produce simulated or digital diagnostic data at block 54 of a robust nature as it allows one to have the truth data for many variations of operation of the system 14. This is of course starkly different of having to generate data for training of a classifier using real-world measurement and recording techniques. It is important for the purposes of obtaining digital diagnostic data is that the characteristics and parameters of the patient 18 and of the physical manifestations of the disease, and its various types, and progressions is varied so as to obtain a very robust digital diagnostic dataset.

In particular, in one example embodiment, the computer-generated diagnostic data is in the form of LOR which is then used to reconstruct 3D images as described above.

The method 50 comprises the step of separating the computer-generated digital diagnostic data into a training and validation data set and training the classifier of the type described above with the training data set as being a portion of the digital diagnostic data, at block 56. In one example embodiment, the collection of all the training data as described above is fed into the classifier, preferably in the form of a CNN classifier, to train the same.

Once trained, the method 50 comprises the step of validating the performance of the classifier, at block 58, by using the validation data set which is a part of the computer-generated digital diagnostic data generated in step 54. In this way, supervised learning of the classifier is achieved and it may be conveniently determined whether or not a trained classifier is effectively performing, or not.

Figure 8:
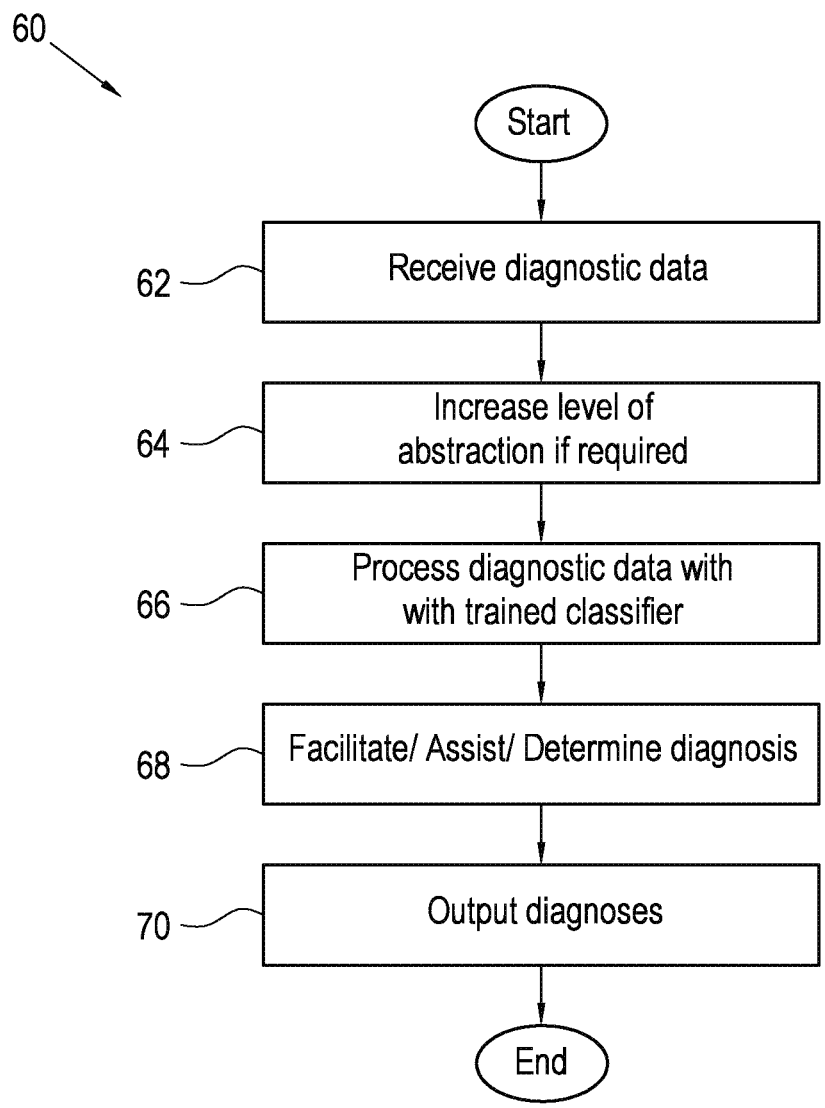
FIG. 8 shows a block flow diagram of a method for facilitating and/or assisting in diagnosing a patient in accordance with an example embodiment of the invention.

Referring to FIG. 8 of the drawings, a method of facilitating and/or assisting a diagnosis in the system 14 is generally indicated by reference numeral 60. In one example embodiment, the method 60 of improving tomographic images.

In the case of PET scans, the method comprises radio-isotopes/radiotracers being introduced into the person 18 according to the part of the person being imaged.

In any event, once the person 18, i.e., the patient 18 is positioned relative to the detector arrangement 12, the arrangement 12 is configured to detect PET photons emanating from interacting with the tissue of the patient 18 being imaged by the system 14.

It follows that the method 60 comprises receiving diagnostic data, at block 62, from the detector arrangement 12 in a wireless or hardwired fashion.

If necessary, the method 60 may comprise an optionally increasing level of abstraction of the diagnostic data received. This step may be required in instances where the diagnostic data received in step 62 above is of a very low level of data abstraction, for example, raw diagnostic data/signals (though in some advanced example embodiments this may not be necessary). The level of abstraction may be increased by way of the manner described above by processing the raw diagnostic data to obtain LoR, then from LoR to a 2D set of 2D projections (forming the 4D sinogram), 3D images using image reconstruction techniques, and then image feature extraction as described above.

The method 60 then comprises processing the diagnostic data received with the trained classifier as described herein. As herein described as length, the trained classifier is conveniently is able to determine whether or not the received diagnostic data is indicative of disease or not, at block 68. For example, in the case of COVID-19, the tissue of the patient 18 being examined by the system 14 is the lung tissue, wherein the classifier is configured to give an indication of the presence of COVID-19, presence and severity of any lung damage, etc. based on simulated data.

If it is determined that tissue being imaged is diseased, the method 60 may comprise generating a suitable output diagnosis recommendation, at block 70. Similarly, if it is determined that tissue being imaged is not diseased, the method 60 may comprise generating a suitable output diagnosis recommendation, at block 70.

In this way, the system 10 may accurately perform clinical analysis to correctly identify the pathologies present and make the proper diagnosis and/or recommendations of diagnosis (in other words an automatic first/second opinion).

Figure 9:
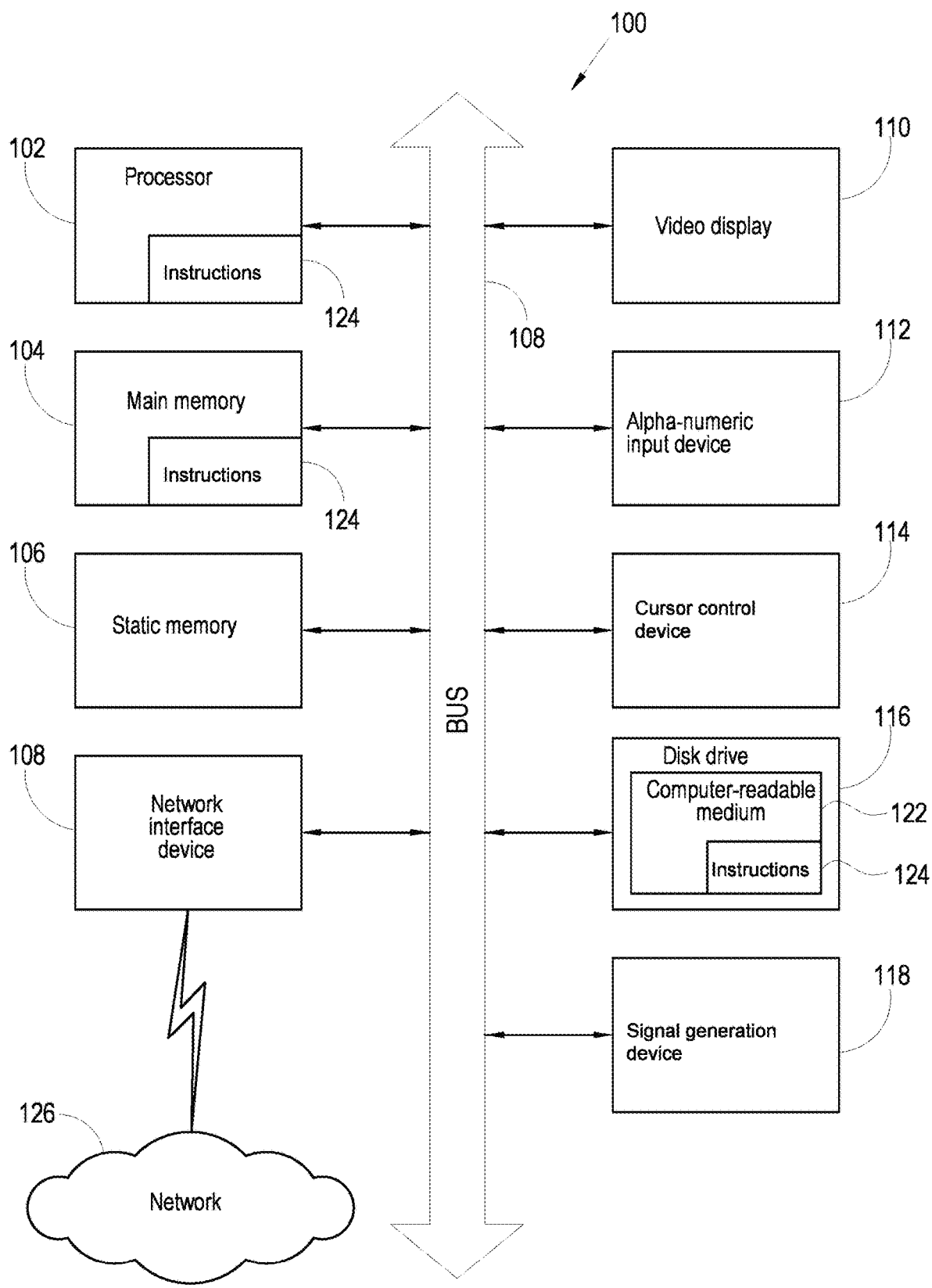
FIG. 9 shows a diagrammatic representation of a machine in the example form of a computer system in which a set of instructions for causing the machine to perform any one or more of the methodologies discussed herein, may be executed.

Referring now to FIG. 9 of the drawings which shows a diagrammatic representation of the machine in the example of a computer system 100 within which a set of instructions, for causing the machine to perform any one or more of the methodologies discussed herein, may be executed. In other example embodiments, the machine operates as a standalone device or may be connected (e.g., networked) to other machines. In a networked example embodiment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated for convenience, the term "machine" shall also be taken to include any collection of machines, including virtual machines, that individually or jointly execute a set (or multiple sets) of instructions to perform any one or more of the methodologies discussed herein.

In any event, the example computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse, or touchpad), a disk drive unit 116, a signal generation device 118 (e.g., a speaker) and a network interface device 120.

The disk drive unit 116 includes a non-transitory machine-readable medium 112 storing one or more sets of instructions and data structures (e.g., software 124) embodying or utilised by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilising any one of a number of well-known transfer protocols (e.g., HTTP).

Although the machine-readable medium 112 is shown in an example embodiment to be a single medium, the term "machine-readable medium" may refer to a single medium or multiple medium (e.g., a centralized or distributed memory store, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilised by or associated with such a set of instructions. The term "machine-readable medium" may accordingly be taken to include, but not be limited to, solid-state memories, optical and magnetic media, and carrier wave signals.

In this invention as disclosed herein, a methods and systems are proposed to generate very accurate image data with a full description of all microscopic ray-by ray and interaction by interaction physics processes by advanced, realistic and very detailed computer simulation or modelling. This is the basis of a method to first understand fully and then account for statistical and systematic processes which are relevant for the improvement of the image reconstruction process based on the raw imaging data from the detectors.

It is further noted that machine based learning and artificial intelligence techniques can be applied both to image reconstruction and image improvement, and also to the pattern recognition processes applied to the reconstructed image, or even applied to the basic ray data or Lines of Response themselves. The application of machine learning or artificial intelligence techniques is not novel. It can be taken as obvious. However, the critical step in the development of these techniques is the training of the algorithms. In the case of supervised learning, using classification or feature identification, one would have to rely on an additional set of labels or require a data set for which the truth was known. In the case of unsupervised learning which can look for underlying image patterns or feature groupings, one may not have the full truth, but ultimately, one would have to benchmark and validate the algorithm against the truth. This is the crucial step that will determine the power of the machine learning or artificial intelligence approach. It can be very tedious to require patient sourced truth data to create an adequate number of examples for algorithm training and validation. To the extent that this is not done sufficiently, to the detriment of the performance of the algorithms and their generality to all possible image inputs to accurately produce the required correct image analysis.

In this invention, a method is further proposed to generate very accurate simulated image data with a full truth description by advanced, realistic, and detailed computer simulation or modelling. For this one requires a digital twin of the entire system duplicating the design of all components and accurately simulating all physical processes, signal creation and processing and any other requirements that would produce the same data as from a complete actualized system in a real case application. The generation from the digital twin of an extended set of accurate but simulated data along with completely known features and classifications or any other required labels of the reconstructed images from this data will enable proper training of the algorithms to be used for any required clinical analysis using these known truths about each simulated example in this generated set. This forms the basis of the novel method to train, improve and validate the algorithm models outlined in this invention for the image types stated previously. The same model can also be used to improve the actual image formation by properly accounting for statistical and systematic effects that would otherwise deteriorate the reconstructed image. Machine learning or artificial intelligence could also be applied to image formation.

In this way the digital twin concept can improve both image formation and pattern recognition. It can be applied in a deterministic way and also to develop machine learning and artificial intelligence solutions, both to the image reconstruction and the pattern recognition or classifications or feature identification or any other analysis required. This use of a combined approach leads to greatly improved clinical analysis using the described system in a clinical application.

The invention claimed is:

1. A method of processing data from a medical diagnostic system which comprises a detector arrangement configured to detect interaction of high energy particles with tissue, the method comprising:
   detecting, by the detector arrangement of the medical diagnostic system, interactions of high energy particles with tissue to generate diagnostic data;
   receiving the diagnostic data generated by the detector arrangement;
   generating digital diagnostic data using a digital twin,
   wherein the digital twin is a computer-implemented simulation of at least part of the medical diagnostic system, and is configured to simulate physical interaction between the particles, the tissue, and the detector arrangement;
   training a machine-based classifier using the digital diagnostic data generated from the digital twin;
   receiving a first set of experimental diagnostic data associated with tissue with an indication of pathologies of tissue with or without undesired material therein;
   receiving a second set of experimental diagnostic data corresponding to one or both of quantitative and qualitative aspects of pathologies of tissue with or without undesirable material therein;
   validating and optimizing the digital diagnostic data generated by the digital twin by benchmarking the digital diagnostic data against at least one of the first and second sets of experimental diagnostic data; and
   processing the received diagnostic data with the trained machine-based classifier to produce a diagnostic output that facilitates and/or assists a medical diagnosis.

2. The method as claimed in claim 1, wherein the digital twin is configured to simulate radiation from a radiation source in tissue or from an externally applied radiation source interacting with the tissue, simulate interaction of the radiation with the tissue of a human or animal, and simulate the interaction of the high energy particles from the radiation source with the detector arrangement to thereby generate the digital diagnostic data.

3. The method as claimed in claim 1, wherein the digital twin is configured to digitally construct a plurality of digital versions of tissue and/or human or animal patients, both healthy and diseased, as such tissue or patients would appear to the detector arrangement to thereby generate the digital diagnostic data.

4. The method as claimed in claim 1, wherein the method further comprising:
   varying parameters of the digital twin and capturing digital diagnostic data corresponding to simulations of the varied parameters as training and validation datasets;
   training the machine-based classifier with the training dataset;
   validating performance of the trained machine-based classifier with the validation dataset; and
   facilitating an iterative optimization of the digital twin by comparing the digital diagnostic data generated by the digital twin to at least one of the first and second sets of experimental diagnostic data.

5. The method as claimed in claim 4, further comprising:
   storing weights and architecture of the trained machine-based learning classifier in a non-transitory memory storage device.

6. The method as claimed in claim 1,
   wherein the received diagnostic data is data that is selected from the group consisting of: data indicative of gamma ray strikes/hit on the detector arrangement, lines of response (LoR), 4D projections, 3D images, and image features, and
   wherein the digital diagnostic data is matched to the received diagnostic data.

7. The method as claimed in claim 6, further comprising:
   pre-processing the diagnostic data to increase a data abstraction level thereof and/or improve a quality thereof prior to processing with the trained machine-based learning classifier.

8. The method as claimed in claim 1, wherein the diagnostic data comprises one or more reconstructed 3D images, and wherein the processing of the received diagnostic data with the trained machine-based learning classifier comprises processing blocks of the one or more 3D images in an overlapping fashion with the trained machine-based learning classifier.

9. The method as claimed in claim 1, wherein the received diagnostic data comprises reconstructed 3D images, and the method further comprises:
   correcting irregularities and/or defects in the reconstructed 3D images.

10. The method as claimed in claim 1, further comprising:
    processing the received digital diagnostic data with the digital diagnostic data using deterministic or iterative techniques to improve image reconstruction.

11. The method as claimed in claim 1, wherein the processing the received diagnostic data comprises comparing the received diagnostic data with the digital diagnostic data and, in response to the comparing, modifying at least one parameter of a tomographic reconstruction algorithm that generates tomographic images from the received diagnostic data, thereby improving image quality.

12. The method as claimed in claim 11, further comprising:
    generating a reconstructed image from the generated digital diagnostic data with the tomographic reconstruction algorithm;
    comparing the reconstructed image with the digital twin to determine accuracy; and
    varying one or more parameters of the tomographic reconstruction algorithm in response to the comparison to optimize the tomographic reconstruction algorithm.

13. A non-transitory computer readable medium storing a set of non-transitory computer executable instructions which, when executed by one or more processors, cause the one or more processors to perform the method according to claim 1.

14. A medical diagnostic system:
    a detector arrangement of the medical diagnostic system, the detector arrangement configured to detect interactions of high energy particles with tissue to generate diagnostic data;
    a non-transitory memory storage device; and
    one or more processors configured to:
      receive the diagnostic data generated by the detector arrangement;
      generate digital diagnostic data using a digital twin,
      wherein the digital twin is a computer-implemented simulation of at least part of the medical diagnostic system, and is configured to simulate physical interaction between the particles, the tissue, and the detector arrangement;
      train a machine-based classifier using the digital diagnostic data generated from the digital twin;

receive a first set of experimental diagnostic data associated with tissue with an indication of pathologies of tissue with or without undesired material therein;

receive a second set of experimental diagnostic data corresponding to one or both of quantitative and qualitative aspects of pathologies of tissue with or without undesirable material therein;

validate and optimize the digital diagnostic data generated by the digital twin by benchmarking the digital diagnostic data against at least one of the first and second sets of experimental diagnostic data; and process the received diagnostic data with the trained machine-based classifier to produce a diagnostic output that facilitates and/or assists a medical diagnosis.

15. The system as claimed in claim 14,
wherein the received diagnostic data is data that is selected from the group consisting of: data indicative of gamma ray strikes/hit on the detector arrangement, lines of response (LoR), 4D projections, 3D images, and image features, and
wherein the digital diagnostic data is matched to the received diagnostic data.

16. The system as claimed in claim 14, wherein the one or more processors are configured to: pre-process the diagnostic data to increase a data abstraction level thereof and/or improve the quality thereof prior to processing with the trained machine-based learning classifier.

17. The system as claimed in claim 14, wherein the diagnostic data comprises one or more reconstructed 3D images, and wherein the one or more processors are configured to process the received diagnostic data with the trained machine-based learning classifier by processing blocks of the one or more 3D image in an overlapping fashion with the trained machine-based learning classifier.

18. The system as claimed in claim 14, wherein the received diagnostic data comprises reconstructed 3D images, and wherein the one or more processors are configured to correct irregularities and/or defects in the reconstructed 3D images.

19. The system as claimed in claim 14, wherein the one or more processors are configured to process the received digital diagnostic data with the digital diagnostic data with deterministic or iterative techniques to improve image reconstruction.

20. The system as claimed in claim 14, wherein the one or more processors are configured to:
generate a reconstructed image with a tomographic reconstruction algorithm;
compare the reconstructed image with the digital twin to determine accuracy; and
vary one or more parameters of the tomographic reconstruction algorithm in response to the comparison to optimize the tomographic algorithm.

* * * * *